Nov. 1, 1966   D. ENGELSMANN ETAL   3,282,185
DEVICES FOR RELEASABLY HOLDING FILM CARTRIDGES IN CAMERAS
Filed May 5, 1964
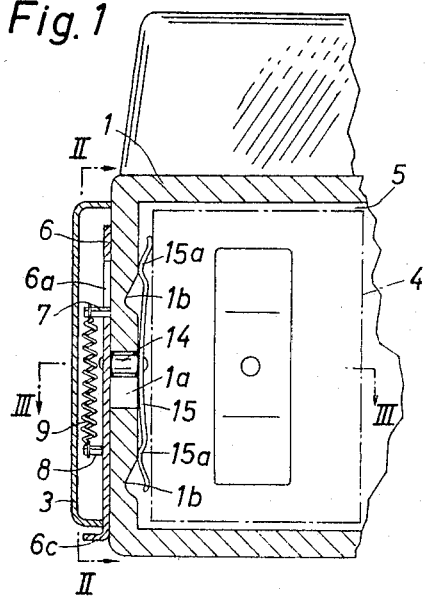
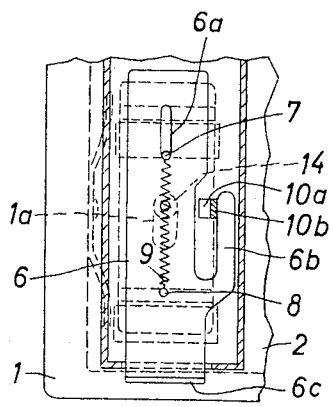
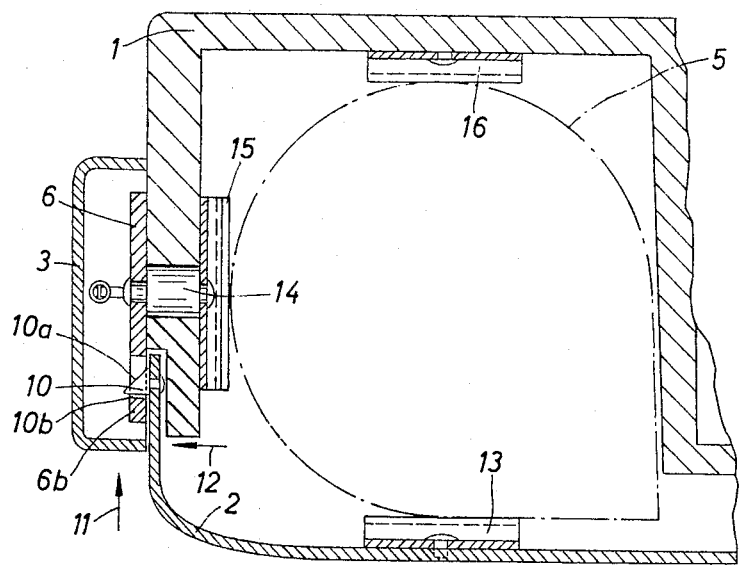
INVENTORS
DIETER ENGELSMANN
ROLF SCHRÖDER
BY
Michael S. Striker
Attorney

United States Patent Office 3,282,185
Patented Nov. 1, 1966

3,282,185
DEVICES FOR RELEASABLY HOLDING FILM CARTRIDGES IN CAMERAS
Dieter Engelsmann, Unterhaching, Munich, and Rolf Schröder, Munich, Germany, assignors to Agfa Aktiengesellschaft, Leverkusen, Germany
Filed May 5, 1964, Ser. No. 365,090
Claims priority, application Germany, Dec. 20, 1963, A 44,851
10 Claims. (Cl. 95—31)

The present invention relates to cameras.

More particularly, the present invention relates to that type of camera which has a housing formed in its interior with chambers for receiving film cartridges.

Particular problems are involved in connection with the releasable retaining of such film cartridges within the camera housing. It is on the one hand highly desirable to reliably retain these cartridges in the camera housing, and on the other hand it is of course also highly desirable to be able to easily remove these film cartridges so that they can be replaced.

The conventional structure which is provided for this purpose has several drawbacks. Thus, it is known to provide suitable springs or levers for releasably retaining film cartridges within the camera housings, but with none of the conventional constructions is it possible to easily remove a cartridge from the interior of the camera housing. Up to the present time all of the known structures for releasably retaining cartridges within the housing require a certain skill and dexterity on the part of the operator in order to remove the cartridges from the housing, and this is of course a considerable disadvantage particularly where operators are not very experienced or do not have the required manual dexterity which is essential with the conventional constructions.

It is accordingly a primary object of the present invention to provide a structure for releasably holding a film cartridge in the interior of a camera housing and which when it releases a film cartridge enables the latter to be quickly and conveniently displaced out of the camera housing without requiring any particular manual dexterity on the part of the operator.

Another object of the present invention is to provide a cartridge holding structure which while it will reliably hold a cartridge in the camera when the camera is closed will at the same time, in a fully automatic manner, release the cartridge for movement out of the camera housing whenever the camera housing is opened.

Another object of the present invention is to provide a structure which will releasably hold a cartridge in a cartridge chamber in the interior of the camera housing and which will be in its holding position ready to releasably hold a cartridge even before a cartridge is introduced into the chamber and while the camera is open, while at the same time this releasable holding structure is capable of being automatically displaced to a release position releasing the cartridge for easy convenient movement out of the camera when the camera is initially opened.

Furthermore, it is an object of the present invention to provide a structure capable of accomplishing the above objects and at the same time composed of relatively small number of simple elements which are very reliable in operation and which require practically no maintenance.

With these objects in view the invention includes, in a camera, a camera housing means formed in its interior with a chamber for receiving a film cartridge and capable of being opened and closed. A releasable holding means is carried by the camera housing means for releasably holding a film cartridge in the cardridge chamber, this releasable holding means being supported by the camera housing means for movement between a holding position holding a cartridge in the cartridge chamber and a release position releasing the cartridge for movement out of the chamber. A manually operable lock means is carried by the camera housing means for movement between a locking position retaining the camera housing means in its closed position and an unlocking position releasing the camera housing to be opened, and this manually operable lock means of the invention is operatively connected with the releasable holding means for displacing the latter from its holding to its release position when the lock means is displaced from its locking to its unlocking position and for returning the holding means from its release to its holding position when the lock means is returned from its unlocking to its locking position, so that with this construction whenever the camera housing is unlocked a cartridge is released for movement out of the camera housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal sectional elevation of one end portion of a camera which is provided with the structure of the invention;

FIG. 2 is a fragmentary sectional end view of the structure of FIG. 1 taken along line II—II of FIG. 1 in the direction of the arrows; and FIG. 3 is a sectional plan view of the structure of FIG. 1 taken along line III—III of FIG. 1 in the direction of the arrows and shown in the structure on an enlarged scale as compared to FIGS. 1 and 2.

Referring now to the drawings, there is shown therein a camera housing means 1 which includes a closure member 2 in the form, for example, of a rear camera cover which may be hingedly or otherwise connected to the remainder of the camera housing means for movement to and from a position closing the housing, the member 2 moving in the direction of the arrow 11 shown in the lower left corner of FIG. 3 toward its position illustrated in FIG. 3 closing the housing 1.

The housing 1 is formed in its interior with a hollow cartridge chamber 5 for receiving a film cartridge 4, and in addition to camera housing includes a housing part 3 connected to the remainder of the housing and accommodating a manually operable lock means for releasably locking the closure member 2 in its position shown in FIG. 3 where it closes the housing 1.

The manually operable lock means includes a flat lock member 6 which is adapted to slide vertically along the exterior surface of the left end wall of the housing 1, as viewed in FIGS. 1 and 3, and the bottom end of the housing part 3 is formed with a slot through which the lower end of the lock member 6 extends, this lock member 6 having just beneath the housing part 3 a manually engageable portion 6c. In order to guide the lock member 6 of the manually operable lock means for vertical movement this lock member 6 is formed with an alongated vertical slot 6a through which extends a stationary pin 7 which is fixedly carried by the left wall of the housing 1 at the exterior thereof, and this pin-and-slot assembly 7, 6a together with the slot in the bottom wall of the housing part 3 form a guiding structure for guiding the lock member 6 for vertical movement.

In accordance with the invention the lock member 6 has fixedly connected thereto, as by being formed integrally therewith, an elongated springy locking extension 6b which at its bottom end, as viewed in FIG. 2, is integral with and projects laterally from the elongated lock member 6. Beyond its bottom end the springy extension 6b also extends vertically so that it has an elongated portion which extends in the same general direction as that in which the lock member 6 is moved by the operator, and this elongated springy extension 6b is adapted to be deflected laterally, in the direction of the arrow 12 shown at the lower left portion of FIG. 3, by a camming projection 10, during movement of this camming projection 10 in the direction of the arrow 11 toward the position shown in FIG. 3. The camming projection 10 is carried by the closure member 2 for movement with the latter, and when the closure member 2 is displaced in the direction of the arrow 11 toward the closed position shown in FIG. 3, the camming projection 10 will with its front inclined face 10a engage and deflect the springy extension 6b in the direction of the arrow 12 of FIG. 3, and as soon as the inclined camming face 10a moves beyond the extension 6b the latter will due to its inherent resiliency snap back to the position shown in FIG. 3 where it is located behind the rearwardly directed locking face 10b of the camming projection 10, and with the parts in this position the closure member 2 is locked in its position closing the housing 1.

A spring means 9 urges the lock member 6 to its locking position shown in the drawings, and for this purpose the spring means 9 is in the form of an elongated coil spring fixed at its upper end to the pin 7 and at its lower end to a pin 8 which is fixedly carried by and projects from the lock member 6 in the manner shown in FIGS. 1 and 2. Thus, when the operator does not displace the lock member 6 downwardly in opposition to the spring 9, this spring 9 will automatically hold the lock member 6 in its locking position shown in the drawings. In order to unlock the camera it is only necessary for the operator to engage the lower portion 6c of the lock member 6 and displace the latter downwardly from its locking position shown in the drawings to an unlocking position where the top end of the elongated portion of the extension 6b is situated slightly beneath the camming projection 10 so that the closure member 2 is now released for movement to its open position giving access to the cartridge chamber 5, and it will be noted that during downward movement of the lock member 6 the elongated portion of the springy extension 6b moves downwardly along the camming member 10 in the same direction that the member 6 is displaced by the operator. With the camera in its open position the operator need only release the lock member 6 so that the spring 9 will return it to its locking position, and thereafter when the operator returns the closure member 2 in the direction of the arrow 11 of FIG. 3 to its closed position, the camming member 10 will cooperate with the springy extension 6b deflecting the latter until it snaps behind the member 10, as described above, so that in this way the lock member 6 is already in its locking position before the cammera is actually closed and the closing movement of the closure member 2 will result in automatic interengagement between the elements 10 and 6b to maintain the closure member in its closed position.

A spring means 13 is provided for urging the closure member 2 away from its closed position shown in FIG. 3, so that when the top end of the extension 6b is displaced beneath the member 10 this spring 13 will at least start the movement of the closure member 2 away from its position closing the housing 9. This spring means 13 is carried by the closure member 2 and is in the form of an elongated leaf spring having free ends or bulging portions which extend forwardly from the closure member 2 into engagement with a cartridge 4 in the interior of the chamber 5 for pressing against this cartridge 4, so that when the lock means 6 is displaced by the operator to its unlocking position the pressure of the spring means 13 on the cartridge 4 will act to initiate the movement of the closure member 2 away from its position closing the housing 1. In addition, it is to be noted that the housing 1 carries a front leaf spring 16 engaging the cartridge 4 and pressing against the latter so as to urge it rearwardly, and this spring 16 which is fixedly carried by a front wall portion of the housing 1 may be identical with the spring 13. Thus, the force of the spring 16 also acts together with the spring 13 to urge the closure member 2 away from its closed position, in a direction opposite to that indicated by the arrow 11, but it is to be noted that when the spring 16 expands it will transmit its force through the cartridge 4 and the spring 13 to the closure member 2, so that the spring 16 also acts to at least initiate the movement of the cartridge 4 out of the camera housing.

The structure of the invention includes a releasable holding means 15 for releasably holding the cartridge 4 in the chamber 5, and this releasable holding means 15, in accordance with the invention, is operatively connected with the manually operable lock means 6 to be displaced from a holding position releasably holding the cartridge 4 in the chamber 5 to a position releasing the cartridge 4 for movement out of the chamber 5 when the operator displaces the lock means 6 from its locking to its unlocking position. For this purpose the left wall of the camera housing 1, as viewed in FIG. 1, is formed with an elongated vertical slot 1a and with a pair of recesses 1b respectively situated above and below the slot 1a and located at the inner surface of the wall of the camera housing and communicating with the interior of the chamber 5. A pin 14 extends through the slot 1a and is fixed at its opposite ends respectively to the leaf spring 15 and the lock member 6, so that in this way the releasable holding means 15 is operatively connected to the manually operable lock means 6 to be automatically actuated when the operator actuates the lock means 6 or when the spring 9 returns the lock means 6 from its unlocking to its locking position. The elongated leaf spring 15 which forms the releasable holding means of the invention has a pair of bulging or curved portions 15a which have substantially the same curvature as the recesses 1b and which are adapted to be respectively received in the recesses 1b when the lock member 6 has been displaced downwardly by the operator to a position releasing the cam 10, and the mating configurations of the curved portions 15a of the spring 15 and the recesses 1b of the camera housing wall is such that when the curved portions 15a are received in the recesses 1b, respectively, the spring 15 lies flat against the wall of the camera housing and is spaced from the cartridge 4 so that the latter can be removed without difficulty from the chamber 5, and as was pointed out above the spring 16 will automatically initiate such movement of the cartridge 4 out of the housing chamber 5. It is to be noted that the recesses 1b as well as the curved portions 15a of the spring 15 are inclined with respect to the direction of movement of the spring 15 so that the curved portions 15a will slide smoothly into and out of the recesses 1b during vertical displacement of the spring 15.

Thus, whenever the operator actuates the lock means so as to open the camera, the operator will displace the lock member 6 downwardly in opposition to the spring 9 and the releasable holding means 15 will necessarily move downwardly with the lock member 6 by the same distance as the latter, with the result that the curved portions 15a automatically enter into the recesses 1b thus placing the releasable holding means 15 in its release position out of engagement with the cartridge 4, so that the latter can be removed in a convenient easy manner from the housing. Of course, as soon as the top end of the extension 6b is beneath the cam 10 the closure member 2 is displaced to an open position so that the cartridge 4 is free to move out of the space 5 by the time the releasable holding means 15 has been displaced to its release position.

Assuming now that the operator releases the lock member 6 while the closure member 2 is still in its open position, then of course the spring 9 will automatically return the lock means to its locking position, and the leaf spring 15 will be displaced upwardly to its closing position inasmuch as the curved portions 15a will be displaced along the inclined surfaces of the recesses 1b out of the latter and thus the ends of the leaf spring 15 will be deflected toward the interior of the chamber 5 to a position where they will hold a cartridge therein. When a new cartridge 4 is now introduced into the chamber 5, the spring 15 presses the cartridge 4 against the surface which defines the chamber 5, and when the cartridge 4 is displaced by the operator all the way into the chamber 5 into engagement with the spring 16, the spring 15 will maintain the cartridge 4 in engagement with the spring 16. Thus, the cartridge 4 is reliably held in the camera against any rotary movement therein. The movement of the closure member 2 in the direction of the arrow 11 to its closed position will cause the spring 13 to press against the cartridge 4 so that the latter is held very securely in the camera, and when the lock means 6 is again displaced to its open position releasing the closure member 2 the above operations will be repeated.

Thus, with the invention the cartridge will on the one hand be reliably held within the camera but on the other hand when the structure which locks and unlocks the camera is actuated to unlock the camera the structure which holds the cartridge in the camera automatically is displaced to a release position releasing the cartridge for movement out of the camera.

Of course, the invention is not limited to the above-described specific details which are shown in the drawings. For example it is possible to use instead of a manually operable lock means as described above a manually operable lock means which has a button which is pressed by the operator in order to open the camera housing, and a releasable holding means can take the form of a lever assembly which when a button of the above type is pressed to open the camera is automatically actuated so as to eject the cartridge 4 from the interior of the camera housing.

It will be understood that each of the elements described above, or two or more together, may also find a useful application in other types of camera differing from the types described above.

While the invention has been illustrated and described as embodied in cameras having film cartridges therein, it is not intended to be limited to the details shown since various modifications and structural changes may be made without departing in any way from the spirit of the present invenion.

Without further analysis, the foregoing will so fully reveal the gist of the present invention that others can by applying current knowledge readily adapt for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, camera housing means formed in its interior with a chamber for a film cartridge and including a closure member movable to and from a position closing said camera housing means, said closure member carrying a camming projection; a lock member carried by said housing means for movement between locking and unlocking positions, said lock member having a springy extension located, when said lock member is in said locking position thereof, in the path of movement of said camming projection when said closure member is moved to said closed position thereof to be cammed by said camming projection to a position temporarily deflected by said camming projection to a location beside the latter as said camming projection moves past said springy extension, whereupon the moment said camming projection is located beyond said springy extension, the latter snaps behind said camming projection to maintain said closure member in said position closing said camera housing means, said lock member when moved to said unlocking position displacing said springy extension away from said camming projection to release said closure member for movement away from said position closing said camera housing means; and releasable holding means carried by said camera housing means for movement between a holding position holding a cartridge in said chamber and a release position releasing a cartridge for movement out of said chamber, said releasable holding means being operatively connected to said lock member for movement from said holding to said release position when said lock member is moved from said locking to said unlocking position thereof, so that a cartridge in said chamber is released simultaneously with release of said closure member for movement away from said position closing said housing means.

2. In a camera as recited in claim 1, said camming projection having an inclined camming surface which engages and deflects said springy extension during movement of said closure member to said position closing said housing means, and said camming projection having next to said inclined camming surface a locking surface behind which said extension snaps to maintain said closure member in said position closing said housing means.

3. In a camera, in combination, camera housing means formed in its interior with a chamber for receiving a film cartridge, said camera housing means including a closure member movable to and from a position closing said camera housing means; spring means carried by said closure member for urging the latter away from said position; manually operable lock means carried by said camera housing means for movement between a locking position maintaining said closure member in opposition to said spring means in said position thereof and an unlocking position releasing said closure member for movement away from said position by said spring means; releasable holding means communicating with the interior of said chamber and having a release position releasing a cartridge for movement out of said chamber and a holding position holding a cartridge in said chamber, said holding means being operatively connected to said manually operable lock means for movement from said holding to said release positions when said lock means is displaced from said locking to said unlocking position and for movement back to said holding position when said lock means returns to said locking position, so that when said lock means is actuated to be displaced to said unlocking position thereof said holding means is automatically displaced to said release position releasing a cartridge for movement out of said chamber.

4. In a camera, in combination, camera housing means formed in its interior with a cartridge chamber for receiving a film cartridge and including a closure member movable to and from a position closing said camera housing means, said closure member carrying a camming projection; a lock member carried by said camera housing means for movement between locking and unlocking positions, said lock member having an elongated springy extension fixed at one end to and extending from said lock member, said extension including an elongated portion located beside said lock member, spaced therefrom, and extending in the same general direction that said lock member is moved when displaced between said locking and unlocking positions thereof, said extension, when said lock member is in said locking position thereof, being located in the path of movement of said camming projection when said closure member is moved to said position thereof to be deflected by said camming projection and to then snap behind said camming projection so as to hold said closure member in said position thereof, said lock member when displaced from said locking to said unlocking position thereof displaces said extension along said camming projection to locate said extension beyond said camming projection so as to release said closure member for movement away from said position thereof; and releasable holding means communicating with the interior of said chamber and having a holding position holding a cartridge therein and a release position releasing a cartridge for movement out of said chamber, said releasable holding means being operatively connected to said lock member to be displaced by the latter from said holding to said release position when said lock member is displaced from said locking to said unlocking position and to be returned from said release to said holding position when said lock member returns from said unlocking to said locking position thereof, whereby a cartridge is released for movement out of said chamber when said lock member is displaced to said unlocking position freeing said closure member for movement away from said position thereof.

5. In a camera, in combination, camera housing means formed in its interior with a chamber for receiving a film cartridge and including a closure member movable to and from a position closing said camera housing means; manually operable lock means carried by said camera housing means for movement between a position locking said closure member in said position closing said housing means and an unlocking position releasing said closure member for movement away from said position thereof; releasable holding means communicating with the interior of said chamber and mounted on said camera housing means movable between a holding position holding a cartridge therein and a release position releasing a cartridge for movement out of said chamber, said releasable holding means being operatively connected to said lock means for movement from said holding to said release position when said lock means is moved from said locking to said unlocking position thereof and for movement from said release to said holding position when said lock means returns from said unlocking to said locking position thereof, so that when said lock means is actuated to be displaced to said unlocking position thereof said holding means is automatically displaced to said release position releasing a cartridge for movement out of said chamber.

6. The combination according to claim 5, including spring means connected to said housing means and said manually operable means for yieldably maintaining the latter in said locking position thereof.

7. In a camera according to claim 5, said housing means having a wall which defines at least part of said chamber for receiving a film cartridge, said wall being formed with at least one recess directed toward the interior of said chamber, said releasable holding means comprising a leaf spring engaging said wall and having a position extending into said recess for releasing a cartridge for movement out of said chamber, and said lock means including means connected to said leaf spring for displacing the latter out of said recess for compressing said leaf spring between said wall and a cartridge in said chamber to releasably hold a cartridge therein.

8. In a camera as recited in claim 7, said leaf spring having a portion of substantially the same configuration as said recess received in the latter when said leaf spring releases a cartridge for movement out of said chamber.

9. In a camera as recited in claim 8, said recess and said portion of said leaf spring being, at least in part, inclined with respect to the direction of movement of said leaf spring into and out of said recess.

10. In a camera, in combination, a camera housing having a wall defining at least part of a chamber in said camera housing for receiving a film cartridge, said wall having an inner surface directed toward the interior of said chamber and formed with a pair of recesses; an elongated leaf spring extending between and into said recesses in one position of said leaf spring, said leaf spring having curved portions which are respectively received in said recesses in said one position of said leaf spring; means operatively connected to said leaf spring for displacing the latter in a direction wihch moves said curved portions thereof out of said recesses so that said leaf spring is deflected by said inner surface of said wall toward the interior of said chamber to press against a cartridge therein for releasably holding a cartridge in said chamber, said wall being formed with an elongated slot extending in the direction of movement of said leaf spring to and from its position where said curved portions are respectively in said recesses; a pin fixed to said leaf spring and extending through said slot to the exterior of said housing; and a manually operable lock member fixed to said pin at the exterior of said housing and capable of being displaced between locking and unlocking positions, said lock member when in said unlocking position thereof situating said leaf spring in a position where its curved portions are in said recesses and when in said locking position thereof situating said leaf spring in a position where it presses against a cartridge in said chamber.

References Cited by the Examiner

UNITED STATES PATENTS

| 2,183,529 | 12/1939 | Fairbanks | 352—74 |
| 2,351,088 | 6/1944 | Wilson et al. | 352—73 |
| 2,449,626 | 9/1948 | Suthann | 352—74 |
| 2,960,017 | 11/1960 | Kopp et al. | 95—31 |

NORTON ANSHER, *Primary Examiner.*

V. A. SMITH, *Assistant Examiner.*